United States Patent
Martinis et al.

(10) Patent No.: US 9,725,778 B2
(45) Date of Patent: Aug. 8, 2017

(54) METHOD AND APPARATUS FOR PRODUCTION OF DIRECT REDUCED IRON (DRI) UTILIZING COKE OVEN GAS

(71) Applicants: HYL TECHNOLOGIES, S.A. DE C.V., San Nicolás de los Garza (MX); DANIELI & C. OFFICINE MECCANICHE, S.p.A., Buttrio (IT)

(72) Inventors: Alessandro Martinis, Pozzuolo del Friuli (IT); Jorge-Octavio Becerra-Novoa, Monterrey (MX); Michele Condosta, Vigodarzere (IT); Eugenio Zendejas-Martinez, Monterrey (MX)

(73) Assignees: HYL TECHNOLOGIES, S.A. DE C.V., San Nicolas de Losa Garza, Nuevo Leon (MX); DANIELI & C. OFFICINE MECCANICHE, S.P.A., Buttrio (UD) (IT)

( * ) Notice: Subject to any disclaimer, the term of this patent is extended or adjusted under 35 U.S.C. 154(b) by 269 days.

(21) Appl. No.: 14/368,258

(22) PCT Filed: Dec. 21, 2012

(86) PCT No.: PCT/IB2012/003062
§ 371 (c)(1),
(2) Date: Jun. 23, 2014

(87) PCT Pub. No.: WO2013/093640
PCT Pub. Date: Jun. 27, 2013

(65) Prior Publication Data
US 2015/0184264 A1      Jul. 2, 2015

Related U.S. Application Data

(60) Provisional application No. 61/578,877, filed on Dec. 21, 2011.

(51) Int. Cl.
*C21B 13/00*        (2006.01)
*C21B 13/02*        (2006.01)
(Continued)

(52) U.S. Cl.
CPC ............ *C21B 13/0073* (2013.01); *C10G 9/16* (2013.01); *C10G 75/00* (2013.01); *C21B 13/02* (2013.01);
(Continued)

(58) Field of Classification Search
CPC .................................................. C21B 13/0073
(Continued)

(56) References Cited

U.S. PATENT DOCUMENTS

| 3,365,387 A | 1/1968 | Cahn et al. |
| 3,557,241 A | 1/1971 | Kivlen et al. |

(Continued)

FOREIGN PATENT DOCUMENTS

| EP | 2 626 124 | 8/2013 |
| GB | 704 490 | 2/1954 |

(Continued)

OTHER PUBLICATIONS

JP English Translation of Japanese Patent No. 56-40198.

*Primary Examiner* — Scott Kastler
(74) *Attorney, Agent, or Firm* — A. Thomas S. Safford; Haug Partners LLP (57) ABSTRACT

Direct reduction process and plant for producing DRI comprising a reduction reactor and at least one reducing gas heater typically comprising a convective heating section and a radiant heating section for raising the reducing gas temperature to a level adequate for iron oxides reduction to metallic iron, typically above 850° C., wherein the reducing gas fed to the reduction reactor comprises a stream of reducing gas recycled from the reduction reactor and a (Continued)

make-up stream of coke oven gas containing carbon compounds which may form carbon deposits in the heating path of said heater, namely BTX and other complex carbon compounds. The heater is provided with means for feeding oxidizing agents, for example steam, steam and air and/or oxygen at predetermined heating tubes successively for eliminating the carbon deposits which may form inside the heating tubes of said heater without interrupting the operation of the plant. The make-up stream of cold COG can be combined with the recycled gas at a point in the gas heating path of the heater where the tubes have a skin wall temperature of at least 700° C., or when the mixture of recycled gas and COG is at a temperature above 700° C. for minimizing clogging or fouling of heating equipment.

13 Claims, 7 Drawing Sheets

(51) Int. Cl.
  *C10G 9/16*   (2006.01)
  *F27D 25/00*  (2010.01)
  *C10G 75/00*  (2006.01)

(52) U.S. Cl.
  CPC ........... *F27D 25/00* (2013.01); *F27D 25/008* (2013.01); *C01B 2203/025* (2013.01); *C01B 2203/0227* (2013.01); *Y02P 10/122* (2015.11); *Y02P 10/126* (2015.11); *Y02P 10/128* (2015.11); *Y02P 10/136* (2015.11); *Y02P 10/265* (2015.11); *Y02P 10/283* (2015.11)

(58) Field of Classification Search
  USPC .......................................................... 75/443
  See application file for complete search history.

(56) References Cited

U.S. PATENT DOCUMENTS

| | | |
|---|---|---|
| 3,641,190 A | 2/1972 | Kivlen et al. |
| 4,253,867 A | 3/1981 | Price-Falcon et al. |
| 4,270,739 A | 6/1981 | Ahrendt et al. |
| 4,351,513 A | 9/1982 | Sanzenbacher |
| 2004/0226406 A1 | 11/2004 | Duarte-Escareno |
| 2006/0027043 A1 | 2/2006 | Zendejas-Martinez |
| 2009/0211401 A1* | 8/2009 | Zendejas-Martinez C21B 13/0073 75/443 |
| 2015/0184264 A1* | 7/2015 | Martinis ............. C21B 13/0073 266/44 |

FOREIGN PATENT DOCUMENTS

| | | |
|---|---|---|
| JP | 49-117388 | 11/1974 |
| JP | 56-40198 | 9/1981 |

\* cited by examiner

METHOD AND APPARATUS FOR PRODUCTION OF DIRECT REDUCED IRON (DRI) UTILIZING COKE OVEN GAS

This application is a National Stage Entry under 35 U.S.C. §371 of PCT/IB2012/003062 filed on Dec. 21, 2012, published on Jun. 27, 2013 under publication number WO 2013/093640, the disclosure of which is incorporated herein by reference.

FIELD OF THE INVENTION

The present invention relates to processes and plants for producing direct reduced iron (DRI) utilizing coke oven gas or syngas having similar composition in a practical and efficient operation.

The importance of natural-gas based DRI production in the steel industry has increased. However, in some areas of the world, where natural gas is not widely available and/or is highly priced, there is a need to design DRI plants which can efficiently and reliably utilize coke oven gas produced by pyrolysis of coal, or also syngas derived from partial combustion of solid or liquid fuels, even though such may still contain high concentrations of heavy carbon compounds.

BACKGROUND OF THE INVENTION

Production of metallic iron for steelmaking is largely based on blast furnaces which produce liquid iron by chemical reduction of iron ores and melting the metallic iron. The reducing agents and the energy for sustaining the reduction reactions as well as the energy required for melting the iron is provided by combustion of coke charged to the blast furnace with air injected into said blast furnace.

Metallurgical coke is produced by pyrolysis of coal in coking furnaces. Coal is heated in order to eliminate most of the volatile components and preserving mostly the carbon structure. Coke is thereby provided with the physical and chemical properties which make it fit for providing energy and burden support in blast furnaces. Volatile matter of coal comprises a number of compounds which are distilled from coke ovens and constitute what is known as coke oven gas (COG).

The volume and composition of COG produced in coke ovens depends on the characteristics of the coal utilized. Raw coke oven gas coming from the coke oven battery has the following typical composition: water about 47%; hydrogen 29% to 55%; methane 13% to 25%; nitrogen 5% to 10%; carbon monoxide 3% to 6%; carbon dioxide 2% to 3%; hydrocarbons (ethane, propane etc.) 2% to 1%; and various contaminants such as tar vapors and light oil vapors (aromatics), consisting mainly of benzene, toluene and xylene (these three generally known as BTX); naphthalene; ammonia; hydrogen sulfide; hydrogen cyanide and other impurities.

Raw COG must be cooled, cleaned and treated in a number of chemical processes for separating valuable compounds such as ammonia and other petrochemicals and for removing sulfur, gums and other substances, so that it may be used as a fuel gas at the coke oven battery and elsewhere in the steelmaking plant. In the COG treatment plant, COG is cooled down to condense out water vapor and contaminants and for removing tar aerosols to prevent gas line/equipment fouling. Ammonia is also removed to prevent gas line corrosion, and naphthalene to prevent gas line fouling by condensation. Light oil is separated for recovery and sale of benzene, toluene and xylene, and hydrogen sulfide has to be removed to meet local emissions regulations. After this treatment, COG typically has the following composition: about 61% hydrogen; about 8% carbon monoxide; about 4% carbon dioxide; about 22% methane; about 1% nitrogen; about 2% water; about 2% of hydrocarbons heavier than methane including ethylene and acetylene; about 5% BTX; and less than about 1% of hydrogen sulfide, tars and naphthalene.

Since coke oven gas has a high calorific value, it is utilized mostly for heating purposes in steel plants, but the chemical values of hydrogen and carbon monoxide can be advantageously utilized for reduction of iron ores to metallic iron for increasing the iron/steel production of steelmaking facilities.

Direct reduction processes may be utilized in the steel industry as an alternative to blast furnaces or to supplement blast furnaces by utilizing sulfur-containing coke oven gas as a way of increasing the metallic iron production. The most common type of reactor where the DRI is produced is a shaft-type moving-bed furnace, having two main sections: a reduction zone where a reducing gas is circulated at a high temperature and through which said reducing gas is recycled in a reduction circuit and a cooling zone located below the reduction zone where the DRI is cooled down to ambient temperatures before being discharged from said reactor by circulating a cooling gas containing also hydrogen and carbon monoxide in a cooling circuit.

Iron-containing particles in the form of pellets, lumps or mixtures thereof are charged to the upper part of a shaft-type reduction reactor and are reduced to metallic iron by contacting said particles with a reducing gas containing hydrogen and carbon monoxide at temperatures above 850° C.

Oxygen is removed from the iron ores by chemical reactions based on hydrogen ($H_2$) and carbon monoxide (CO), for the production of Direct Reduced Iron (DRI) having a high degree of metallization (ratio of metallic iron to total iron content in the DRI). The overall reduction reactions involved in the process are well known and are represented below:

$$Fe_2O_3 + 3H_2 \rightarrow 2Fe + 3H_2O \qquad (1)$$

$$Fe_2O_3 + 3CO \rightarrow 2Fe + 3CO_2 \qquad (2)$$

The hydrogen and carbon monoxide transformed into water and carbon dioxide according to reactions (1) and (2) are separated from the gas stream circulating in the reduction circuit and are substituted by a make-up feed of reducing gas. The reducing gas make-up generally comes from a natural gas reformer, but according to the invention, this make-up gas is COG. The DRI present in the cooling/discharge zone contributes in removing heavy hydrocarbons, BTX, tars and other undesirable compounds present in the COG, whereby these substances are not present in the reduction circuit and fouling problems in the gas heater and other equipment are avoided.

There have been several proposals for utilizing COG in direct reduction processes, for example U.S. Pat. No. 4,253,867 discloses a method of using COG for reducing iron ores wherein a mixture of COG and steam is fed to an intermediate zone located between the reduction zone and the cooling zone of the reduction reactor. Coke oven gas is reformed to hydrogen and carbon monoxide in the reforming zone taking advantage of the catalytic action of the iron and the high temperature of the solid DRI in said reforming zone. This patent does not teach nor suggests any solution for solving the carbon deposition problems when the coke oven gas is heated before being fed to the reduction reactor.

U.S. Pat. No. 4,270,739 and U.S. Pat. No. 4,351,513 disclose a direct reduction process where a sulfur-containing gas such as coke oven gas is desulfurized by the iron-containing particles contained in the reduction reactor by heating and injecting the COG above the reduction zone of the reduction furnace. In the '739 patent, COG is heated in a fired heater before its introduction to the desulfurizing zone; and in the '513 patent, COG is heated by heat-exchange with the flue gases of a reformer. These patents do not even visualize the problems that arise when the COG is heated and forms carbon deposits in the heating equipment therefore no proposal for solving this problem is found in these patents.

U.S. Pat. Nos. 3,365,387, 3,557,241, 3,641,190, and others disclose some proposed methods of cleaning (decoking) process heater tubes wherein hydrocarbon-containing fluids are heated and therefore some carbon deposits are formed within the fluid heating path. The teaching of these patents is that the carbon deposits can be eliminated by reaction with steam and/or air and may be done while the heater is in operation by isolating a heating tube by means of valves for subjecting said pipe to cleaning and the rest of tubes continue with its normal operation, or shutting down the heater and subjecting all tubes to the carbon cleaning process.

None of the above patents however teaches or suggests a special design or arrangement of a heater associated to a direct reduction plant for efficiently heating coke oven gas which presents special problems because of its content of BTX and other complex carbon compounds.

No other relevant prior art has been found concerning the heating of coke oven gas for its use in direct reduction processes.

The prior art proposals present at least one of the following main disadvantages: High oxygen consumption in the case of partial combustion of COG, clogging and fouling of heater tubes, or operation limitations in the case of utilizing the lower portion of the direct reduction reactor for destroying the BTX. The COG is mixed with the recycled process gas, and finally fed to the process gas heater, only after being partially combusted with oxygen in order to completely destroy components that can polymerize and/or give cracking and generate fouling also at low temperature. This configuration requires a high amount of oxygen with the further disadvantage that almost all the methane included in the COG is oxidized and then not available for carbon deposition in the DRI. The partial combustion has additionally a negative effect on the amount of the available reducing agents. If the COG is fed directly to the Process Gas (PG) heater together with the recycled process gas, due to the high content of contaminants, the fouling will clog the heater tubes. If the COG is fed as cooling gas into the cooling/discharge reactor zone in order to promote the BTX and TAR removal, there can be use of up-flow of the COG into the reduction zone as make up of reducing agents. However, the temperatures reached in the cooling section are not enough for complete BTX removal with the consequent presence of these contaminants in the water used for cooling gas quenching. Furthermore, control of the carbon content in the DRI is affected and high carbon DRI only is produced. Also, the DRI discharge temperature is relatively low and therefore the DRI cannot be hot briquetted or directly fed into an electric arc furnace.

Documents cited in this text (including the patents discussed herein), and all documents cited or referenced in the documents cited in this text, are incorporated herein by reference. Documents incorporated by reference into this text or any teachings therein may be used in the practice of this invention.

OBJECTS AND SUMMARY OF THE INVENTION

It is therefore an object of the present invention to provide a process and apparatus for using coke oven gas (COG) in reducing iron ores to DRI in a moving bed reduction reactor with reducing gas recycle.

It is a further object of the present invention to provide a gas heater design that minimizes the carbon deposits when COG or similar syngas is heated or provides on-line cleaning measures for periodically eliminating carbon deposits, to avoid fouling and clogging of the heater tubes.

Other objects of the invention will be hereafter pointed out or will be evident to those skilled in the art.

DETAILED DESCRIPTION OF PREFERRED EMBODIMENTS OF THE INVENTION

In recent years, interest in coke oven gas, used for its chemical content instead of merely as a traditional fuel for heating purposes in steel plants or for power generation, has increased in connection with expanded plans for iron production in integrated steel plants comprising coke ovens and blast furnaces.

Another powerful driver for innovation in iron and steelmaking has been the environmental regulations and worldwide extended importance of decreasing the footprint of industrial operations regarding the emissions of $CO_2$ to the atmosphere. Several initiatives for decreasing $CO_2$ emissions by public and private entities comprise both utilization of COG as reducing agent in DRI plants as well as modifications to blast furnaces for top gas recycling to the blast furnace and setting up a direct reduction system for prereducing iron ores and charging such prereduced material to the blast furnace, thus decreasing the coke consumption per ton of pig iron. Among these proposals, the installation of a DRI plant utilizing coke oven gas for producing DRI or prereduced iron material with efficiency and reliability is a yet unfulfilled need in the steel industry. In order to have an efficient and reliable DRI production plant with COG, the process gas heater is a critical piece of equipment which must be properly conceived for preventing excessive carbon deposits in the heating tubes which significantly impair the heat transfer of the heater and ultimately entirely plug the tubes.

Figure 1:
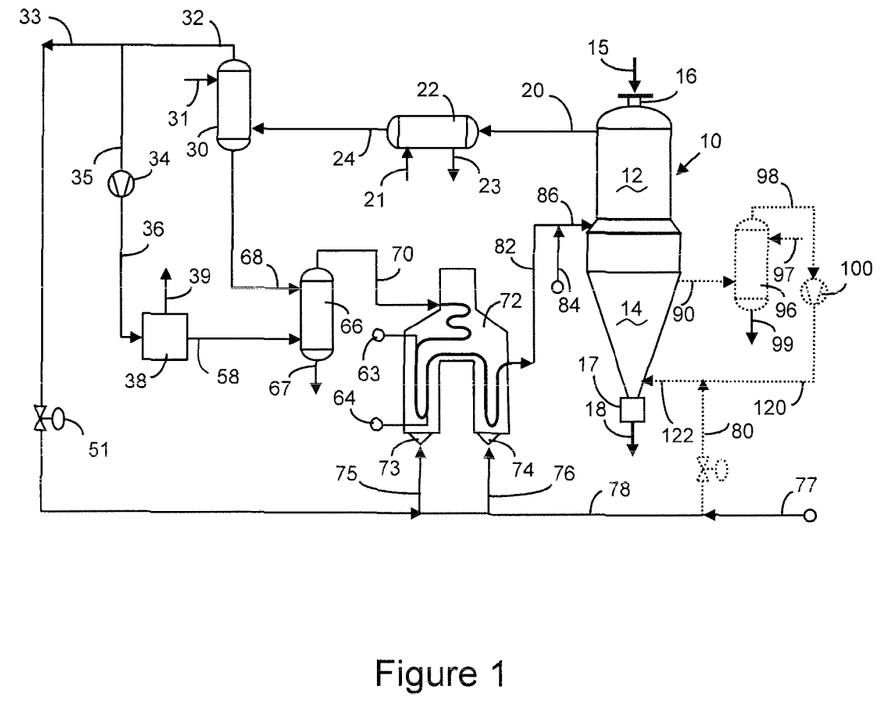
FIG. 1 shows a schematic process diagram of one embodiment of the invention wherein COG is utilized in a direct reduction process and where the COG is fed to the reduction process at an effective point in the heater tubes.

Referring to the attached figures, where like numerals designate like elements in all figures to facilitate the comprehension of the scope and spirit of the invention, and starting with FIG. 1, numeral 10 generally designates a direct reduction reactor having a reduction zone 12 and discharge zone 14 through which DRI 18 is discharged. Iron ore pellets, lumps or mixtures thereof 15 are fed to the reduction zone 12 through inlet 16 and descend by gravity in contact with a reducing gas comprising $H_2$ and CO at high temperature, above 850° C. The residence time of the bed of particles within the reactor is controlled by means of a regulating mechanism 17 in a manner known in the art.

Top gas 20, effluent from the reduction zone 12, is transferred to a heat exchanger 22 wherein the sensible heat of the top gas, typically at a temperature of 350° C. to 550° C. is used for heating recycled gas (or for producing steam) by circulating the recycle gas (or water) through inlet pipe 21 and outlet pipe 23. The top gas passes on through pipe 24 and is then cooled down and washed in a direct contact cooler 30 with cooling water 31 where top gas water, produced by the reduction reactions, is condensed and extracted along with the cooling water out through pipe 68. This combined water can then be utilized for saturating the recycled reducing gas in humidifier 66 and then is withdrawn through pipe 67.

A portion of the dehydrated and cleaned gas exiting from cooler 30 through pipe 32 is led through pipe 35 to a compressor 34 and then through pipe 36 to a $CO_2$ removal unit 38 where $CO_2$ 39 is removed and captured for further uses or for its sequestration, thus contributing to decreasing the $CO_2$ emissions to the atmosphere.

The recycled gas now with a regenerated reducing potential after water and $CO_2$ removal flows through pipe 58 to humidifier 66 where the water content is adjusted to a predetermined level to provide sufficient oxidants for methane reformation while maintaining a good reducing potential of the gas. The recycled gas 70 flows through a pipe to heater 72 where its temperature is raised from below 100° C. to above 850° C. The hot reducing gas stream is fed to reduction zone 12 through pipe 82. An oxygen-containing gas through pipe 84, for example oxygen of industrial purity or oxygen-enriched air, may be injected to pipe 82 for further raising the temperature of the reducing gas to levels in the range of 900° C. to 1100° C., and then is fed to the reduction zone 12.

A portion of the reducing gas in pipe 32 exiting cooler 30 is led through pipe 33 and valve 51 to the burners 73 and 74 of heater 72 through respective pipes 75 and 76 to provide the heat needed for heating the recycled reducing gas. A suitable supplementary fuel gas stream may be used for providing the necessary amount of fuel gas to heater 72 from fuel gas source 77 through pipe 78. Coke oven gas is added through pipe 64 as make-up to the reducing gas loop at a point in the heating path of the heater where the temperature is above about 700° C. so that the carbon deposits, if formed, can be removed on-line by injecting an oxidizing agent 63 for example, steam or steam and air to one or more individual coils at a time.

If it is desired to produce DRI at ambient temperature, a cooling gas, which may be a reducing gas or COG or an inert gas, is circulated through the lower zone 14 of the reduction reactor 10. The cooling gas circuit is shown in dotted lines to indicate that it is optional. The cooling gas is withdrawn from the reactor through pipe 90 and cooled down and washed in cooler 96 with water 97 which flows out through pipe 99. The cooled and clean gas flows through pipe 98 to compressor 100 and then is fed back to zone 14 through pipe 120. Cooling gas make-up 77 is fed through pipe 80 and is fed to zone 14 through pipe 122.

Figure 2:
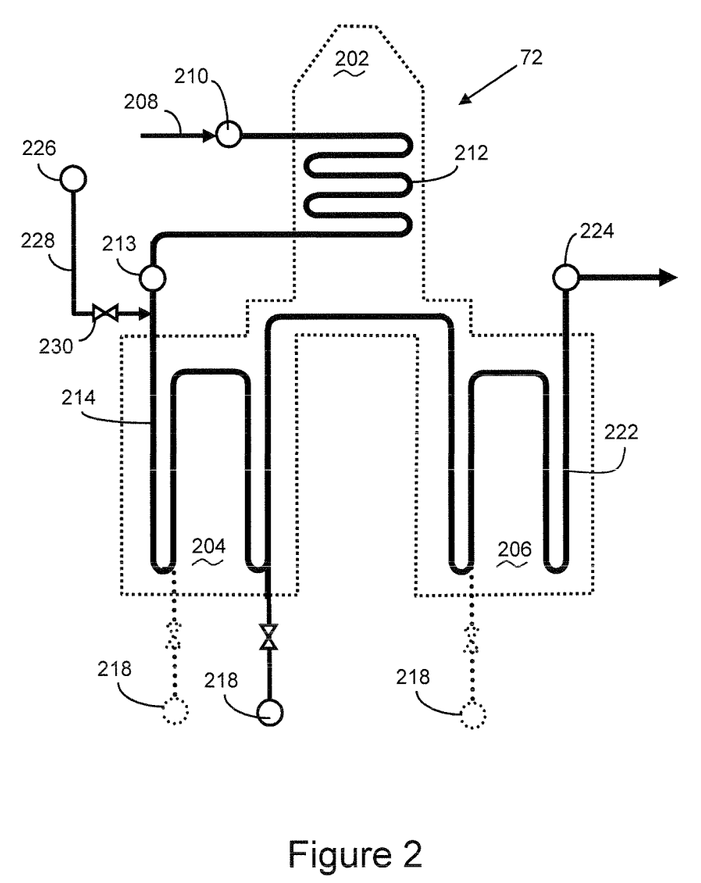
FIG. 2 is a schematic lateral view diagram of the COG heater showing in more detail the feed point location of COG and steam for decoking the heater.

Referring to FIG. 2 a schematic diagram of a gas heater 72 is shown, having a convection zone 202, and radiant zones 204 and 206. The heating coils form a continuous heating tube having section 212 in the convective zone 202, a header 213, and coils 214 and 222 in radiant zones 204 and 206, however it will be understood that the invention applies to other arrangements of heating coils and heater designs.

Recycled reducing gas 208 (e.g. from 70 in FIG. 1) is fed to header 210 which distributes the recycled gas stream among a set of convection coils 212 where the recycled gas is heated typically to a temperature above 600° C., but which can be lower depending on the particular design of the heater. Several points of COG injection 218 have been illustrated in dotted lines and one in full line for indicating that the COG may be fed at an injection point which is chosen in view of the particular configuration of the heater and the temperature profile of the heating tubes. COG may also be fed at a plurality of injection points if it is found convenient for a particular heater design.

The mixture of hot recycled gas and the COG at ambient temperature may be lower than 700° C. and therefore some carbon may be deposited inside the tubes. It is preferred to select the COG injection point where the skin temperature of the heating tubes 214 is above 700° C. so that the tubes are not subject to thermal stresses when the oxidizing agents 226 (e.g. from 63 in FIG. 1) are introduced at high temperature for eliminating the carbon deposits.

COG is fed from header 218 (e.g. from 64 in FIG. 1) to the heating coils 214 where it is mixed with the hot recycled gas and the mixture is then heated to a temperature above 850° C., preferably above 950° C., collected at header 224 and fed to the reduction reactor 10.

An oxidizing agent 226 for periodic cleaning of the heater tubes, for example steam, steam and air or steam and oxygen, can be fed into each of the heater tubes by means of a respective feeding pipe 228 that is provided with a shut-off valve 230 for allowing the oxidizing agent to enter predetermined tubes, one or more at a time so that any carbon deposits that may form and accumulate are eliminated (decoking) from inside the tubes without disturbing the operation of the heater and DRI plant.

On-line-cleaning of the heating tubes may be carried out with high temperature steam with or without oxygen or air along all the length of the tubes for an easy removal of all deposits including the ones that result from the presence of BTX, TAR, and other contaminants in the COG. This is done by injecting steam with or without oxygen or air at high temperature (higher than 500° C.) in the coil being cleaned, slowly changing, in this way, the operative tube temperature profile. The coil inlet zone will reach the new higher temperature value (above 500° C.) guaranteeing an effective fouling removal for the whole coil being cleaned. In order to meet these requirements, tubes metallurgically proper for the foregoing conditions are installed. Only in this way is the removal of all possible fouling, caused mainly by condensation, polymerization and cracking of components like BTX, TAR, that occurs also at low temperatures, guaranteed.

Figure 3:
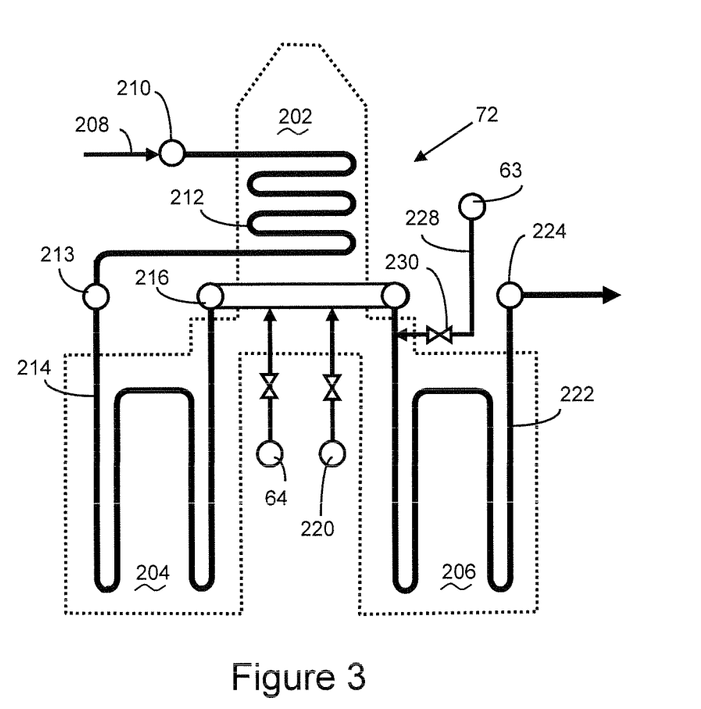
FIG. 3 is a schematic lateral view diagram of a COG heater with an intermediate manifold between radiant zones showing the points of COG mixing with the recycled gas and steam feed for decoking the heater.

Referring to FIG. 3 showing another embodiment of the invention, the gas heater 72 has a convection section 202 and two radiant sections 204 and 206. COG from header 64 (218) at ambient temperature, below 100° C., is fed to manifold 216 wherein it is mixed with the hot recycled gas from 212. The flow rate of the make-up gas stream of COG is about 30% of the flow rate of the recycled gas, the temperature of the mixture drops between about 100° C. and 200° C., resulting in a combined gas stream at a temperature above 700° C. and therefore with a minimum potential of BTX and Tars cracking.

A regulated stream of oxygen 220 may be fed to manifold 216 for partially combusting the hydrocarbons contained in the COG, and also increasing the temperature of the gas mixture. The hot reducing gas is then heated in tubes 222 to a temperature above 850° C., preferably above 950° C., and is collected at header 224 at the temperature adequate for the iron oxides reduction reactions in reactor 10 (perhaps aided by oxygen addition from pipe 84).

Heater cleaning of carbon deposits may also be made on-line for avoiding shutting down the plant operation in the same manner as described in reference to the embodiment of FIG. 2.

Figure 4:
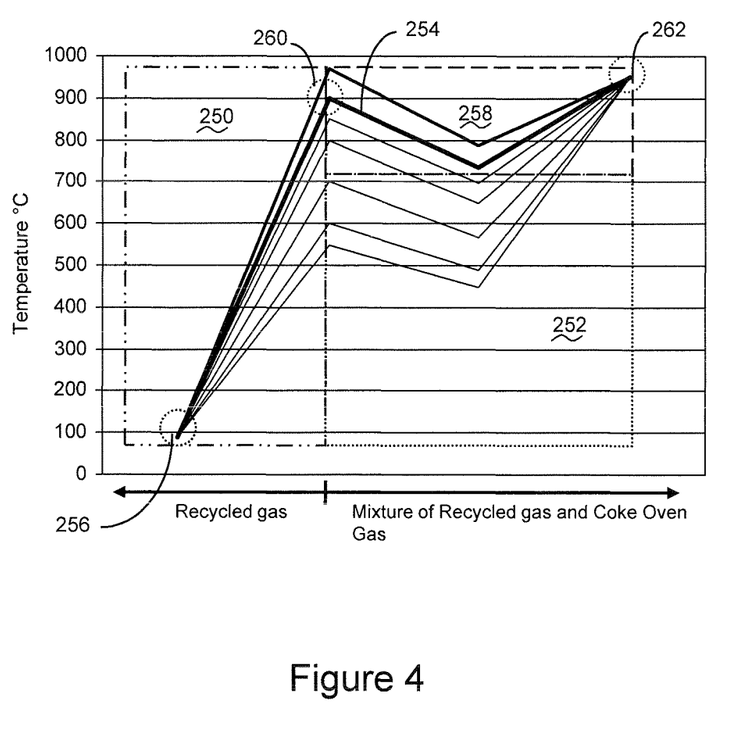
FIG. 4 is a graph of temperature at the different heating stages of the recycled gas and mixture of COG and recycled gas.

FIG. 4 is a schematic diagram of the heating path of the gases in the heater according to the embodiment of the invention shown in FIGS. 2 and 3 as an illustration of the preferred minimum temperature for the first stage heating 250 of the recycled gas from a starting temperature 256, below about 100° C. to a final temperature 262 above 900° C. suitable for reduction of iron oxides. An intermediate temperature 260 is selected so that when the hot recycled gas exiting from the heating coils 214 is mixed with the cold COG 218, the temperature of the mixture is not lower than about 700° C., falling within the potentially fouling zone 252. In this way, the thermodynamic potential of carbon deposition inside the heating tubes is minimized.

Several lines 254 have been illustrated of the temperature profile of the recycled gas from a starting temperature 256 generally below 100° C., to a temperature 262 higher than about 900° C., to indicate that according to a particular application of the invention, the flow rates of recycled gas and of cold COG may vary and therefore the temperature 260 of the first stage heating of recycled gas needed for preventing the mixture of recycled gas and COG from falling below about 700° C. must be selected so that the mixture remains within the operating zone 258.

Figure 5:
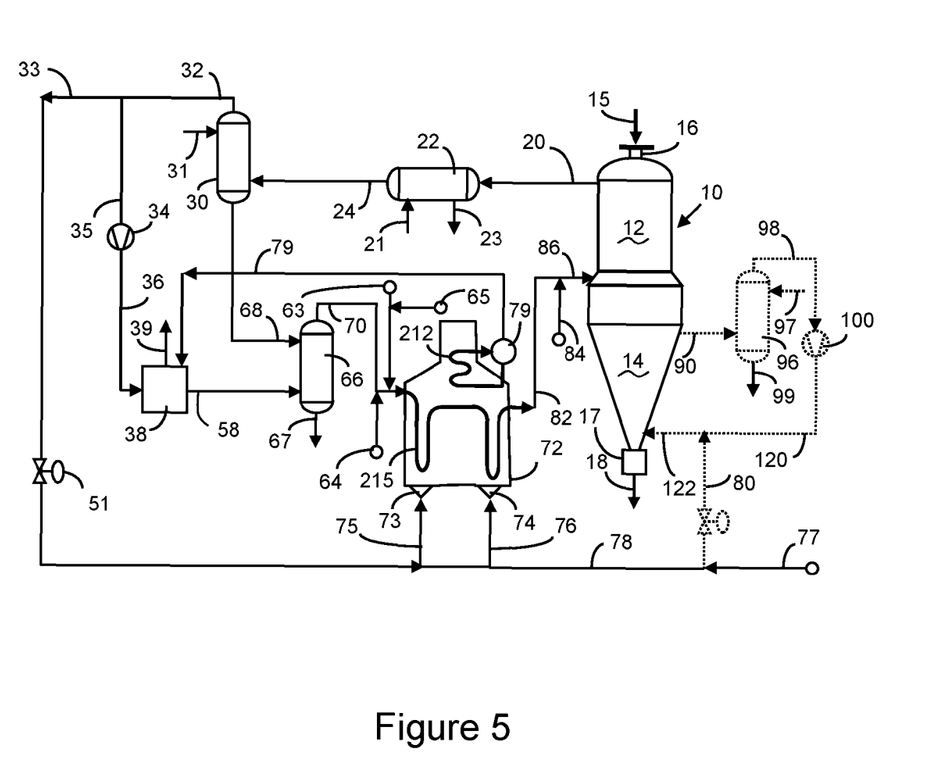
FIG. 5 is a schematic process diagram of another embodiment of the invention wherein the COG is mixed and heated together with recycled gas and the heat of the flue gases of the radiant section is utilized for steam production and/or for heating of other fluids.

Referring now to FIG. 5, another embodiment of the invention is described wherein the COG 64 and the upgraded recycled gas through pipe 70 are simultaneously heated in the same coils 215 installed only in the heater section where high temperatures are present. In this way an effective on line cleaning is also guaranteed. As in the other embodiments herein described, with high temperature steam 63, with or without oxygen or air 65, flows along the full length of the tubes 215 for an easy removal of all deposits including the ones that result from the presence of BTX, TAR, and other contaminants in the COG.

The residual energy of the flue gases can be recovered in a dedicated convective section 202 for producing steam which is collected in steam drum 79 and which may finally used in the $CO_2$ removal unit 38 and/or for the heater cleaning procedure as steam 63. Other heating fluids are also possible for the heat recovery from the combustion flue gases. Also, the sensible heat of the spent gas 20 from the reactor 10 may be recovered in heat exchanger 22 for preheating the cold process gas 70 coming from humidifier 66 and the $CO_2$ absorber plant 38. After this step, the preheated process gas 23 is mixed with COG 64 from battery limit before to being fed to the heater 72.

Figure 6:
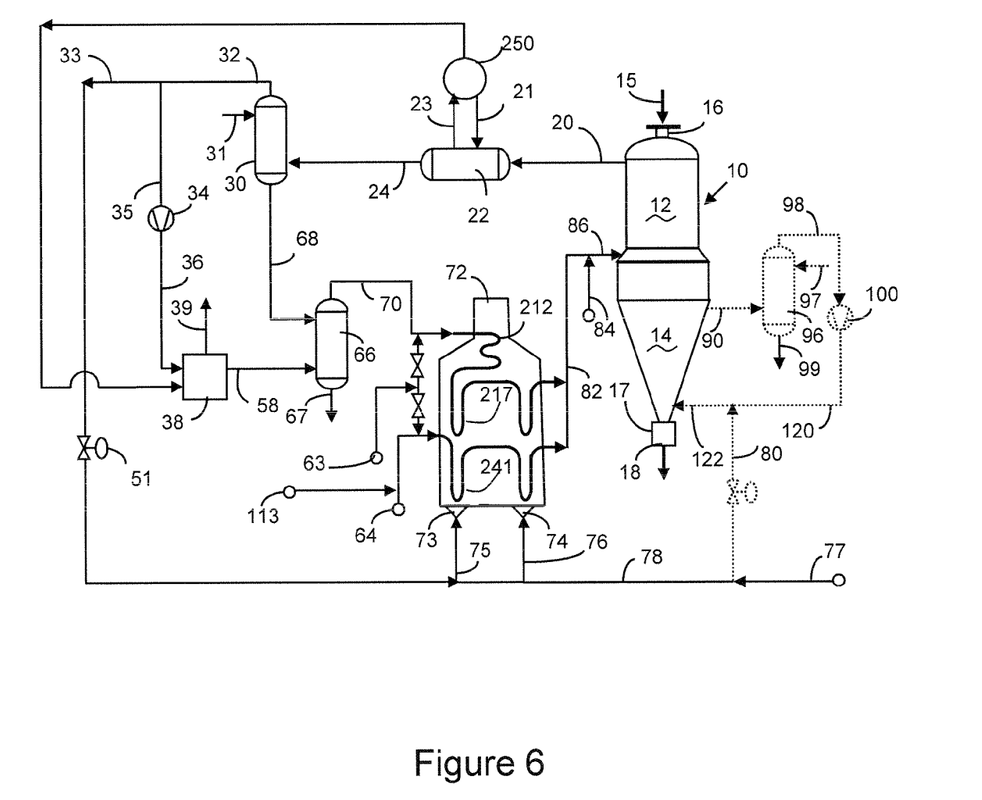
FIG. 6 is a schematic process diagram of another embodiment of the invention wherein the COG is heated in a dedicated radiant section of the heater separate from the radiant section for heating the recycled gas.

With reference to FIG. 6, another embodiment of the invention is herein described wherein the COG 64 is separately preheated in heating coils 241 and recycled gas 70 in other coils 217, which may be within the same heater 72 or in a separate heater. After both streams reach a temperature above 850° C. are combined and fed to the reduction zone 12.

Figure 7:
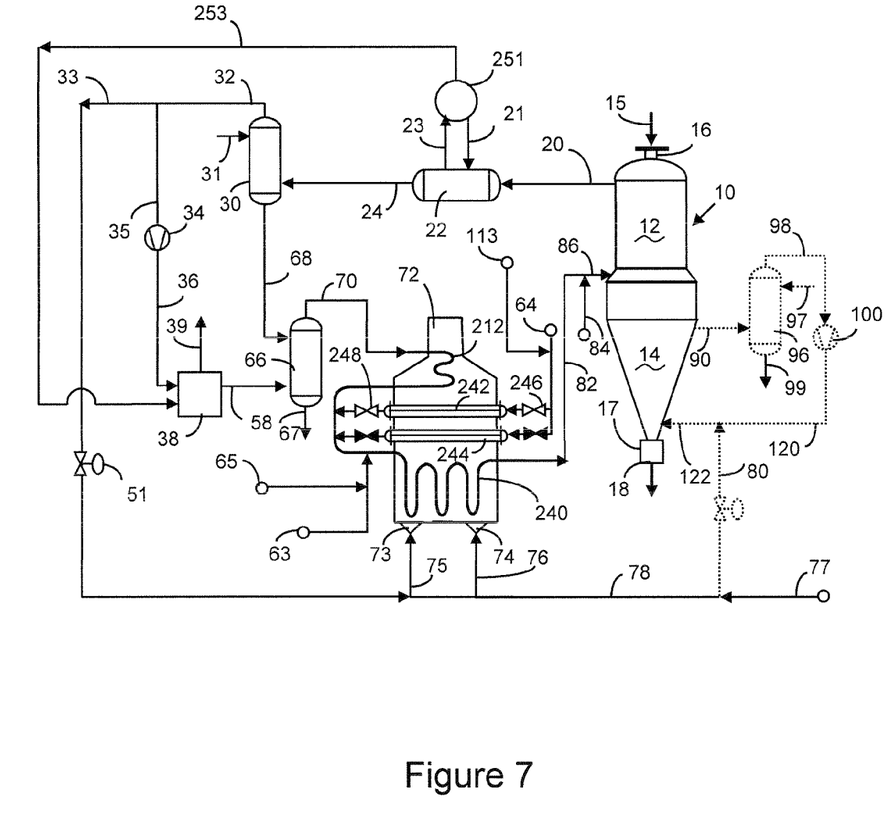
FIG. 7 is a schematic process diagram of another embodiment of the invention wherein the COG is preheated in dedicated convective coils of the convective section of the heater for facilitating cleaning of the COG heating coils.

Referring to FIG. 7, a further embodiment of the invention is shown wherein the recycled gas 70 is preheated until reaching a temperature at which carbon deposition is avoided, in dedicated coils 212 installed in the convective section of the heater 72. The COG 64 is preheated in dedicated heat exchangers 242 and 244 that exploit the sensible heat of the flue gases in the convective section of the heater 72, or alternatively using different energy sources as for example diathermic oils. Subsequently, the preheated recycled gas and the preheated COG are mixed and are finally heated to the desired temperature above 850° C. in coils 240 in the radiant section of the heater 72.

Preferably the two heat exchangers 242 and 244 are provided for preheating the COG 64, one in operation and the other in stand-by mode by means of suitable valves, in order to guarantee a continuous operation of the plant also when mechanical cleaning for removal of the fouling caused by condensation and polymerization of BTX and TAR, may be required.

An on-line cleaning for the coils 240 installed in the radiant section of the heater 72, through which the mixed gas flows, is designed in order to provide a high temperature stream inside the whole tubes for an efficient removal of all kinds of fouling.

The steam 63 for cleaning procedure can be produced in the convective coils 212 of the heater and collected in steam drum 251, or in a different boiler, and used, for example, in $CO_2$ removal unit 38 through pipe 253.

Applicants have calculated the proportion of BTX decomposed by temperature based on the above temperature ranges. The calculations are shown in Table 1 below and indicate that after reaching a temperature between 600° C. and 700° C. about 90% of the hydrocarbons $C_nH_m$ and about 90% of the BTX are destroyed.

TABLE 1

| Temperature Range ° C. | % of decomposition of CnHn | % of decomposition of BTX |
|---|---|---|
| 400-500 | 16.6 | 0 |
| 500-530 | 55.2 | 0 |
| 530-600 | 23 | 85.7 |
| 600-700 | 90 | 90 |

The problems of carbon deposits (coking) in the tubes of heater 72 and in general in the flow path of the COG arise mainly because the saturated carbon compounds crack and decompose in the range of temperatures from 500° C. to 550° C., while the unsaturated compounds start cracking at temperatures below 400° C. More specifically the BTX compounds decompose at temperatures in the range 530° C. and 610° C.

A thermodynamic calculation of the amount of carbon which can potentially be deposited in the heater tubes of a typical industrial plant having a capacity of 1.6 Million tons per year in certain temperature ranges is shown in Table 2, however, actual amounts will depend on the kinetics of the chemical reactions involved at the precise locations in the heater.

TABLE 2

| Temperature Range ° C. | Kg of Carbon per hour |
| --- | --- |
| 400-500 | 404 |
| 500-530 | 1,115 |
| 530-600 | 2,203 |
| 600-700 | 928 |

The above thermodynamic calculations show that 97.87% of BTX and Hydrocarbons are cracked forming carbon deposits in the "colder" zones of the heater.

Typically, process gas heaters are designed having a convective section and a radiant section, the convective section serving as a pre-heating zone for efficiently using the heat of the flue gases generated by the combustion at the heater burners. If coke oven gas is fed to the convective zone of a typical gas heater used in direct reduction plants, the maximum temperature reachable at the convective section of a heater is about 660° C., for a heater having 87.5% efficiency without preheating of combustion air and a temperature of the burner gases of about 1,100° C.

The ratio of the flow rate of coke oven gas to the flow rate of recycled gas is in the order of 0.25 to 0.30, therefore the temperature of the mixture will be in the range of about 520° C. and 530° C., then coke deposits would be formed in the radiant section of the heater. It was found that for gasifying the carbon deposits in the heather tubes it is necessary to heat said carbon deposits to a temperature of 800° C. or higher.

The present invention provides a way of using COG in a direct reduction process without concerns about having some amounts of contaminants in the COG that is fed as make up gas avoiding the need of a partial combustion of the COG (consuming an high amount of oxygen and almost the total available $CH_4$ with inevitable reduction of the reducing agents) in order to eliminate contaminants that polymerize and condensate in the heater, because an efficient removal of the fouling carbon deposits is performed on-line, without the need of shutting down the plant.

It is of course to be understood that additional objects, advantages and other novel features of the invention will become apparent to those skilled in the art and that may be learned with practice of the invention. The above description of some preferred embodiments has been presented for purposes of illustration and is not intended to be exhaustive or to limit the scope of the invention to the precise disclosed embodiments. The above embodiments were described to provide illustrations of the principles of the invention and of its practical applications, but it is also understood that a number of modifications and variations can be made within the scope and spirit of the invention which is defined in the appended claims.

What is claimed is:

1. A direct reduction process for producing DRI comprising a reduction reactor and at least one gas heater comprising heating tubes forming a heating path for raising the reducing gas temperature to a level adequate for iron oxides reduction to metallic iron, wherein said reducing gas fed to the reduction reactor comprises a first stream of reducing gas comprising hydrogen and carbon monoxide and a second stream of coke oven gas (COG) containing carbon compounds which may form carbon deposits in the heating path of said heater, said direct reduction process being characterized by feeding said first stream of said reducing gas to said heater; mixing said first stream of gas with said second stream comprising coke oven gas at a point in the heating path of said heater where the skin temperature of the tubes of said heater is above 700° C., forming a third gas stream; heating said third gas stream to a temperature above 850° C.; and feeding said hot third stream to the reduction reactor.

2. Direct reduction process according to claim 1, being further characterized by heating said first stream of said reducing gas to a temperature above 850° C.;
   mixing said hot first stream of gas with said second stream comprising coke oven gas at a regulated flow rate so that the resulting mixture forms said third gas stream at a temperature above 700° C.

3. Direct reduction process according to claim 1, being further characterized by said heater having a convective section and a radiant section, and heating a combined stream of reducing gas and COG in said radiant section and utilizing the heat of the flue gases from said radiant section to produce steam or to preheat whatever other fluid in the convective section of said heater.

4. Direct reduction process according to claim 3, being further characterized by preheating said first stream of reducing gas in heating tubes located in the convective section of said heater; preheating said second stream of COG in heat exchangers located in the convective section of said heater or located externally of said heater, by means of other heating media different than the flue gases; mixing said preheated first gas stream and said preheated second gas stream to form a third gas stream, heating said third stream to a temperature above 850° C. in the radiant section of the heater and feeding said third gas stream to the reduction reactor.

5. Direct reduction process for producing DRI according to claim 1, being further characterized by said first stream being recycled off-gas from said reduction reactor.

6. Direct reduction process for producing DRI according to claim 2, further characterized by heating said third stream to a temperature in the range between 850° C. to 1100° C.

7. Direct reduction process for producing DRI comprising a reduction reactor and at least one gas heater comprising heating tubes forming a heating path for raising the reducing gas temperature to a level adequate for iron oxides reduction to metallic iron, wherein said reducing gas fed to the reduction reactor comprises a first stream of reducing gas comprising hydrogen and carbon monoxide and a second stream of coke oven gas (COG) containing carbon compounds which may form carbon deposits in the heating path of said heater, said direct reduction process characterized by on-line removal of said carbon deposits in the heating path of said COG by injecting steam, or steam and/or air; or steam and/or air and/or oxygen, into the heater tubes for cleaning any carbon deposits that may form in said tubes, thus minimizing the fouling or clogging problems of the heater as a result of heating said gas comprising COG containing BTX and other complex carbon compounds.

8. Direct reduction process according to claim 7, further characterized by scheduling the feeding of the steam and/or air; or steam and/or air and/or oxygen successively to each tube or group of tubes so that the operation of the reduction process and the heater is not interrupted and so that the overall gas composition of the reducing gas fed to the reduction reactor is suitable for the production of DRI even after the addition of the oxidizing agents to the heater tubes under cleaning of carbon deposits.

9. Direct reduction process according to claim 7, being further characterized by heating said first stream of said reducing gas to a temperature above 850° C.; mixing said hot first stream of gas with said second stream comprising coke oven gas at a regulated flow rate so that the resulting mixture forms said third gas stream at a temperature above 700° C.

10. Direct reduction process according to claim 7, being further characterized by said heater having a convective section and a radiant section, and heating a combined stream of reducing gas and COG in said radiant section and utilizing the heat of the flue gases from said radiant section to produce steam or to preheat whatever other fluid in the convective section of said heater.

11. Direct reduction process according to claim 10, being further characterized by preheating said first stream of reducing gas in heating tubes located in the convective section of said heater; preheating said second stream of COG in heat exchangers located in the convective section of said heater or located externally of said heater, by means of other heating media different than the flue gases; mixing said preheated first gas stream and said preheated second gas stream to form a third gas stream, heating said third stream to a temperature above 850° C. in the radiant section of the heater and feeding said third gas stream to the reduction reactor.

12. Direct reduction process for producing DRI according to claim 7, being further characterized by said first stream being recycled off-gas from said reduction reactor.

13. Direct reduction process for producing DRI according to claim 9, further characterized by heating said third stream to a temperature in the range between 850° C. to 1100° C.

* * * * *